United States Patent
Takemoto et al.

(10) Patent No.: US 6,993,450 B2
(45) Date of Patent: Jan. 31, 2006

(54) POSITION AND ORIENTATION DETERMINATION METHOD AND APPARATUS AND STORAGE MEDIUM

(75) Inventors: Kazuki Takemoto, Kanagawa (JP); Shinji Uchiyama, Kanagawa (JP); Kiyohide Satoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/351,326

(22) Filed: Jan. 27, 2003

(65) Prior Publication Data

US 2003/0144813 A1 Jul. 31, 2003

(30) Foreign Application Priority Data

Jan. 31, 2002 (JP) .................................... 2002-024107

(51) Int. Cl.
*G01C 17/00* (2006.01)

(52) U.S. Cl. ................... 702/153; 702/150; 345/420
(58) Field of Classification Search ......... 702/150–153; 345/156, 158, 419, 420, 7–9; 348/135, 137, 348/142; 382/276, 296
See application file for complete search history.

(56) References Cited

U.S. PATENT DOCUMENTS

| | | | |
|---|---|---|---|
| 5,319,443 A | 6/1994 | Watanabe et al. | 356/614 |
| 5,706,419 A * | 1/1998 | Matsugu et al. | 345/420 |
| 2002/0084974 A1 | 7/2002 | Ohshima et al. | 345/156 |
| 2002/0103617 A1 | 8/2002 | Uchiyama et al. | 702/150 |

FOREIGN PATENT DOCUMENTS

| | | |
|---|---|---|
| JP | 02-274490 | 11/1990 |
| JP | 07-035546 A | 2/1995 |
| JP | 08-272414 A | 10/1996 |
| JP | 2889011 B | 5/1999 |

\* cited by examiner

*Primary Examiner*—Michael Nghiem
*Assistant Examiner*—Stephen J. Cherry
(74) *Attorney, Agent, or Firm*—Fitzpatrick, Cella, Harper & Scinto

(57) ABSTRACT

A position and orientation determination apparatus for identifying a parameter indicating the position and orientation of image sensing apparatus which performs image sensing on actual space where plural feature points exist in already-known positions. In the position and orientation determination apparatus, the position and orientation of the image sensing apparatus can be measured by a method other than utilization of video image obtained by image sensing, and a parameter indicating the position and orientation of the image sensing apparatus is obtained. Then, the parameter is corrected based on the plural feature points in the video image of actual space obtained by image sensing by the image sensing apparatus, and a parameter indicating the position and orientation of the image sensing apparatus is identified. Upon correction of the parameter, first, the parameter is corrected by a general method using the feature points, and then correction is performed by rotation about a visual axis, thereby the position and orientation of the image sensing apparatus can be detected with high accuracy.

19 Claims, 14 Drawing Sheets

POSITION AND ORIENTATION DETERMINATION METHOD AND APPARATUS AND STORAGE MEDIUM

FIELD OF THE INVENTION

The present invention relates to position and orientation determination method and apparatus for identification of parameter indicating the position and orientation of image sensing means for image sensing in actual space.

BACKGROUND OF THE INVENTION

In a method for obtaining an external parameter (position and orientation) of camera for image sensing of actual space, methods other than utilization of obtained video image, e.g. measurement of position and orientation of camera by using a position and orientation sensor such as a magnetic sensor, are known. However, in such measurement by position and orientation sensor, the accuracy of measurement is insufficient. Accordingly, if a virtual object is overlay-displayed in actual space based on the position and orientation of the camera measured by the position and orientation sensor, the object may be shifted from a desired position.

Conventionally, several methods for improvement in accuracy of position and orientation of camera for image sensing of actual space have been proposed. One of these methods is providing feature points (land marks) in already-known three-dimensional positions in actual space, and correcting the position and orientation of the camera, by using the difference between an actual position of a land mark of interest on an image-sensing plane and a predicted position of the land mark of interest on the image-sensing plane based on the position and orientation of camera at this time.

Further, another one of the methods is calculating the difference between an actual position of each land mark of interest and a predicted position of land mark of interest based on the position and orientation of camera, and correcting the difference by averaging, thereby further improving the reliability of correction on external parameter of camera.

However, in any of the conventional position and orientation correction method, the difference in a rotation angle about the visual axis cannot be removed. The visual axis V here is a straight line connecting a principal point L on the image-sensing plane, as one of camera internal parameters, and a view point position (center of lens) C (FIG. 1). As shown in FIG. 1, the principal point L is an intersection between the visual axis and the image-sensing plane, and the view point position C is calculated upon calculation of camera internal parameters by preprocessing which is called camera calibration.

In general position and orientation correction methods, correction is performed by moving the view point position in parallel to the image-sensing plane or rotating a view point orientation in a pan and/or tilt direction. However, in any of these methods, there is no component in the rotational (roll) direction about the visual axis. Accordingly, in the above-described general correction methods, as the difference in the rotational angle about the visual axis cannot be corrected, even though an image of actual space and an image of unrealistic (virtual) space are combined, the respective positions do not accurately correspond with each other.

SUMMARY OF THE INVENTION

The present invention has been made in consideration of the above-described problems, and has its object to enable detection of position and orientation of image sensing means with high accuracy.

According to the present invention, the foregoing object is attained by providing a position and orientation determination method for identifying a parameter indicating position and orientation of image sensing means for performing image sensing on actual space, in which plural feature points exist in already-known three-dimensional positions, comprising: a measurement step of measuring the position and orientation of the image sensing means by a method other than utilization of video image obtained by image sensing by the image sensing means, and obtaining a first parameter indicating the position and orientation of the image sensing means; and a correction step of correcting the first parameter obtained at the measurement step based on the plural feature points in the video image of the actual space obtained by the measurement unit, and identifying a second parameter indicating the position and orientation of the image sensing means, wherein at the correction step, the first parameter is corrected by rotation of the image sensing means about a visual axis, based on the plural feature points in the video image.

According to another aspect of the present invention, the foregoing object is attained by providing a position and orientation determination apparatus for identifying a parameter indicating position and orientation of image sensing means for performing image sensing on actual space, in which plural feature points exist in already-known three-dimensional positions, comprising: a measurement unit adapted to measure the position and orientation of the image sensing means by a method other than utilization of video image obtained by image sensing by the image sensing means, and obtain a first parameter indicating the position and orientation of the image sensing means; and a correction unit adapted to correct the first parameter obtained by the measurement unit based on the plural feature points in the video image of the actual space obtained by the measurement unit, and identify a second parameter indicating the position and orientation of the image sensing means, wherein the correction unit corrects the first parameter by rotation of the image sensing means about a visual axis, based on the plural feature points in the video image.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

In the present embodiment, a parameter indicating the position and orientation of camera is corrected by using at least one of plural land marks subjected to image sensing, thereafter, correction by rotation about a visual axis is performed based on the plural land marks, and the position and orientation of the camera is accurately detected.

First, as generation correction, a method for correcting an external parameter of camera from one land mark and a method for correcting the external parameter of camera from plural land marks will be described. Next, processing characteristic of the present embodiment for additional correction by rotation about a visual axis will be described.

The land mark here means a marker, which is e.g. a sticky tab having particular color or shape information, artificially attached to an object in actual space, or a particular point in natural scene as a land mark.

Figure 1:
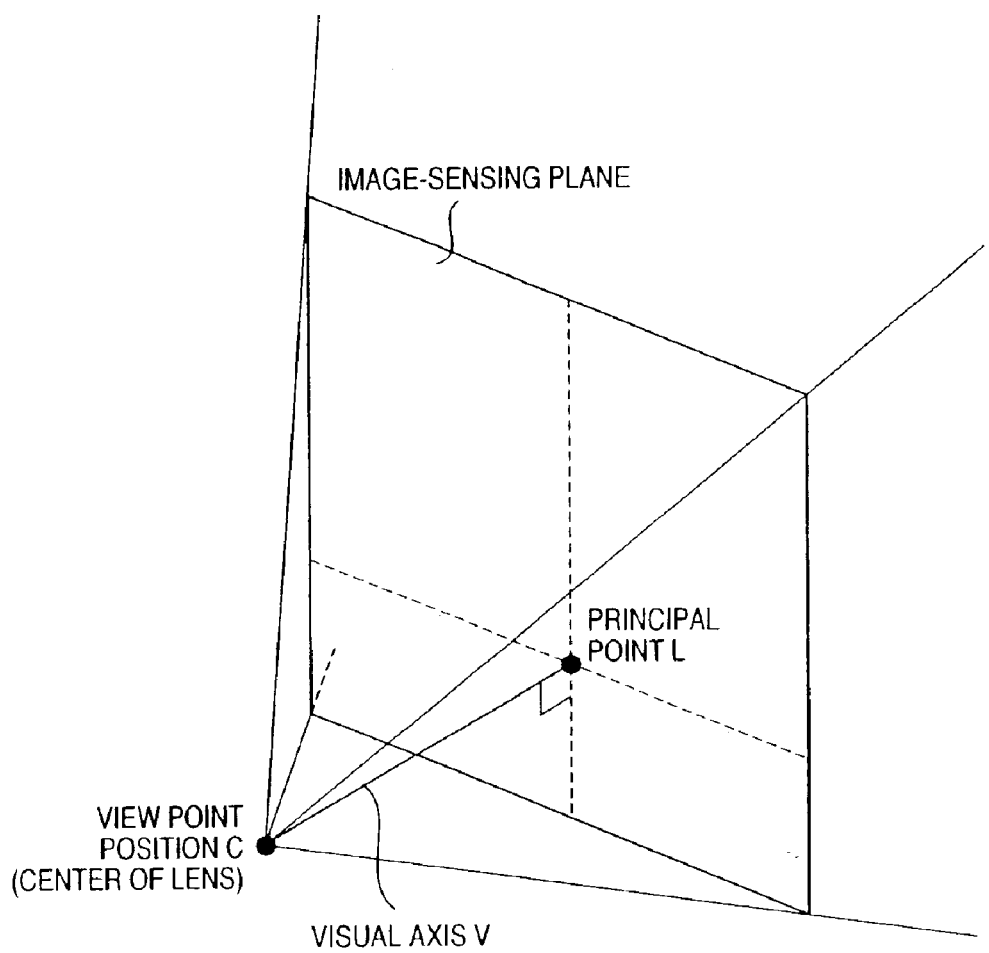
FIG. 1 is a schematic diagram for explanation of visual axis.
Figure 2:
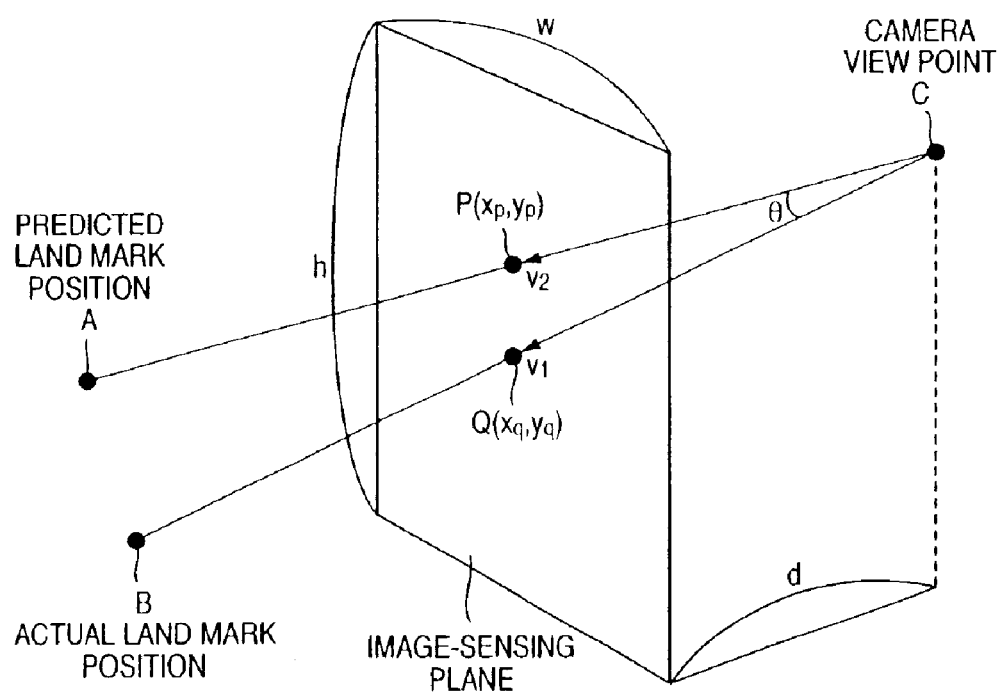
FIG. 2 is a schematic diagram for explanation of general correction method.

FIG. 2 is a schematic diagram for explanation of general correction method for external parameter of camera (parameter indicating the position and orientation). In FIG. 2, a point A indicates the position of land mark predicted based on a parameter indicating the position and orientation of camera; a point B, the actual position of the land mark; and a point C, the position of camera view point. Note that the positions of points A and B are positions in a camera coordinate system, and the point C is an origin point of the camera coordinate system. Further, a point P indicates the position of the point A on an image-sensing plane; and a point Q, the position of the point B on the image-sensing plane. As shown in FIG. 2, the coordinates of the points P and Q are $(x_p, y_p)$ and $(x_q, y_q)$; the width and height of the image-sensing plane are w and h; the focal distance of the camera (the distance between the point C and the image-sensing plane), d; a vector from the point C to the point Q, $v_1$; a vector from the point C to the point P, $v_2$; and an angle formed with the vectors $v_1$ and $v_2$, $\theta$.

At this time, as shown in FIG. 2, there is a shift (difference) between the predicted position of the land mark on the image-sensing plane based on the position and orientation of the camera and the actual position. As a method for correcting the shift, 2 types of methods utilizing one land mark (correction by rotation of camera and correction by parallel movement of camera) and further 2 types of methods utilizing plural land marks (correction by rotation of camera and correction by parallel movement of camera) are known.

First, the methods utilizing one land mark will be described, and the methods utilizing plural land marks will be described next.

<1. Correction Method Utilizing One Land Mark>

First, correction by using one land mark will be described.

Figure 10:
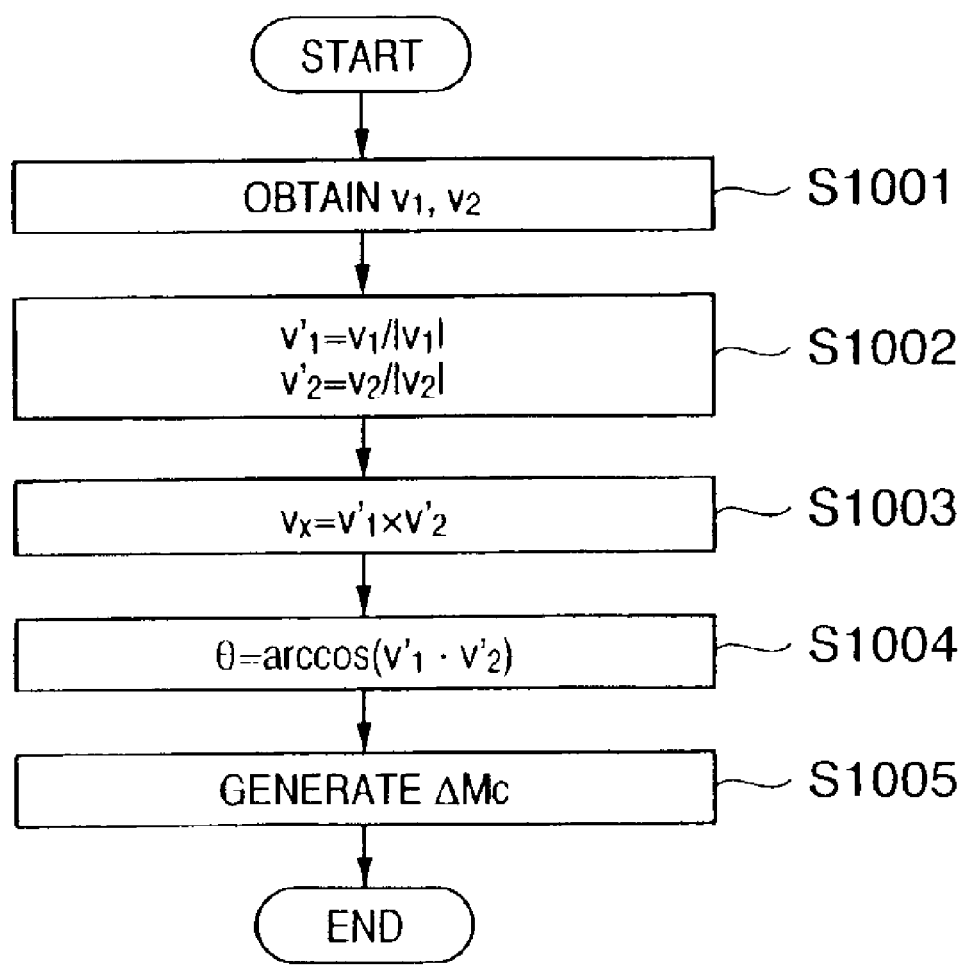
FIG. 10 is a flowchart showing correction by rotation of camera by utilizing one land mark.
Figure 11:
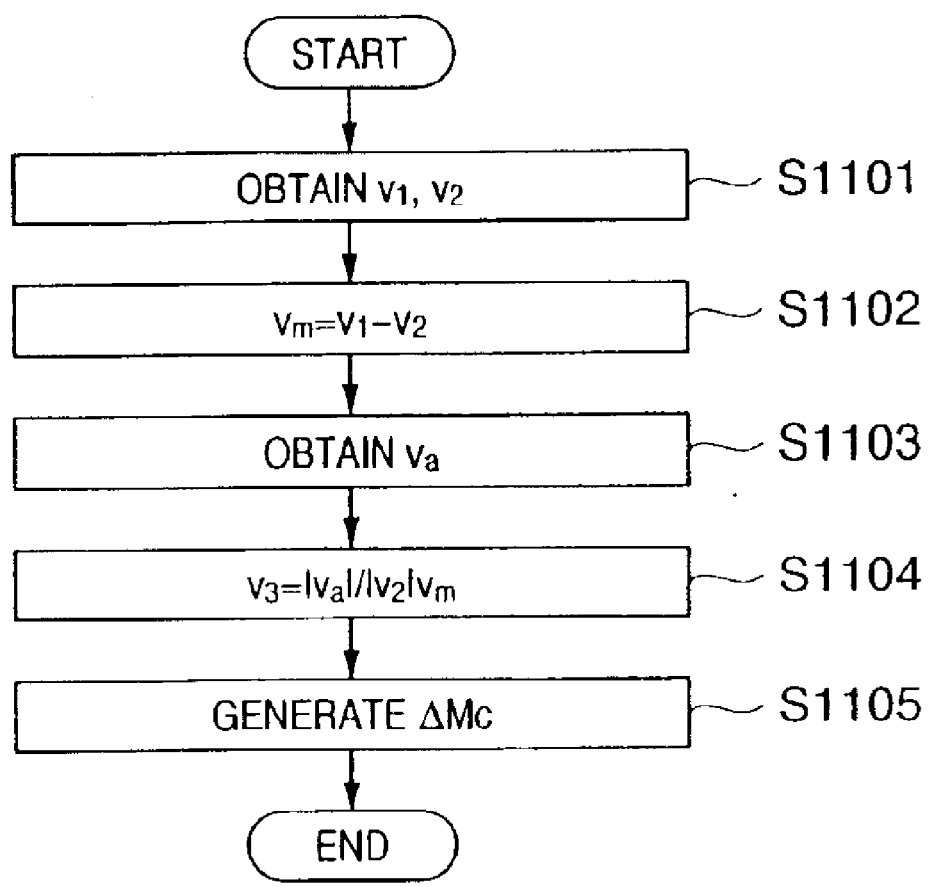
FIG. 11 is a flowchart showing correction by parallel movement of camera by utilizing one land mark.

As the method using one land mark, a method for changing the orientation of camera from a point B direction to a point A direction by $\theta$ while the position of camera is fixed (correction method by rotation of camera), and a method for moving the camera in parallel to the image-sensing plane from the point B to the point A direction by the distance between the points A and B (correction method by parallel movement of camera) are known. Hereinbelow, these 2 methods will be described with reference to the flowcharts of FIGS. 10 and 11.

<1-1. Correction Method by Rotation of Camera Utilizing One Land Mark>

The above-described vectors $v_1$ and $v_2$ are obtained. From the above settings, the respective components of the vectors $v_1$ and $v_2$ are as follows (step S1001).

$$v_1 = \left(x_q - \frac{w}{2}, y_q - \frac{h}{2}, -d\right) \quad \text{[Expression 1]}$$

$$v_2 = \left(x_p - \frac{w}{2}, y_p - \frac{h}{2}, -d\right)$$

Note that the respective vectors are normalized to vectors having a size 1 (step S1002). Note that $|v|$ represents the size of vector v.

$$v'_1 = \frac{v_1}{|v_1|} \quad \text{[Expression 2]}$$

$$v'_2 = \frac{v_2}{|v_2|}$$

In a case where the camera is rotated, the rotation axis is a straight line orthogonal to a plane formed with the vectors $v_1$ and $v_2$ passing through the camera view point position (point C). The vector in the rotation axis direction can be obtained from the vector product between the vectors $v_1$ and $v_2$ (actually, vectors normalized from the vectors $v_1$ and $v_2$ ($v'_1$, $v'_2$) are used) (step S1003).

$$v_x = v'_1 \times v'_2. \quad \text{[Expression 3]}$$

Note that $v_x$ is the directional vector of the rotation axis having components (l, m, n). Further, as the rotation angle $\theta$ is formed with the vectors $v_1$ and $v_2$, it can be obtained as follows (actually, vectors normalized from the vectors $v_1$ and $v_2$ ($v'_1$, $v'_2$) are used) (step S1004).

$$\theta = \arccos(v'_1 \cdot v'_2) \quad \text{[Expression 4]}$$

Accordingly, a correction matrix $\Delta M_c$ used for correction by rotation of camera is calculated as follows (step S1005).

$$\Delta M_c = \begin{bmatrix} ll(1-\cos\theta)+\cos\theta & ml(1-\cos\theta)+n\sin\theta & nl(1-\cos\theta)+m\sin\theta & 0 \\ lm(1-\cos\theta)+n\sin\theta & mm(1-\cos\theta)+\cos\theta & nm(1-\cos\theta)+l\sin\theta & 0 \\ ln(1-\cos\theta)+m\sin\theta & mn(1-\cos\theta)+l\sin\theta & nn(1-\cos\theta)+\cos\theta & 0 \\ 0 & 0 & 0 & 1 \end{bmatrix}$$ [Expression 5]

A matrix indicating the position and orientation of the camera (viewing transformation matrix) is multiplied by the correction matrix $\Delta M_c$, thereby the position and orientation of the camera (external parameter) can be corrected. That is, the point P is displayed in the position of point Q, thus the position of the land mark on the image-sensing plane predicted from the position and orientation parameter corresponds with the actual position. Note that the rotation transformation is made by appropriately combining rotation in a pan direction and/or rotation in a tilt direction.

<1-2. Correction Method by Parallel Movement of Camera Utilizing One Land Mark>

In a case where the difference is corrected by parallel movement of camera, the position of the camera is moved in parallel to the image-sensing plane from the point B in the point A direction by the distance between the points A and B. As a result, what is seen in the position of point P on the image-sensing plane can be seen in the position of point Q. First, the vectors $v_1$ and $v_2$ are obtained (step S1101). Further, a vector $v_m$ from the point P to the point Q is as follows (step S1102).

$$v_m = v_1 - v_2 \quad \text{[Expression 6]}$$

Assuming that a vector from the point C to the point A is $v_a$ (step S1103), as a triangle CPQ and a triangle CAB are similar figures, a vector $V_3$ from the point A to the point B can be obtained as follows (step S1104).

$$v_3 = \frac{|v_a|}{|v_2|} \cdot v_m \quad \text{[Expression 7]}$$

As the shift ($|v_3|$) corresponds to the shift of the position of land mark in camera space, if $v_3 = (s, t, u)$ holds, the correction matrix $\Delta M_c$ used for parallel movement of camera is calculated as follows (step S1105).

$$\Delta M_c = \begin{bmatrix} 1 & 0 & 0 & -s \\ 0 & 1 & 0 & -t \\ 0 & 0 & 1 & -u \\ 0 & 0 & 0 & 1 \end{bmatrix} \quad \text{[Expression 8]}$$

The position and orientation of camera (external parameter) can be corrected by multiplying the matrix indicating the position and orientation of camera by the correction matrix $\Delta M_c$, as a result, what is seen in the position of point P on the image-sensing plane can be seen in the position of point Q.

<2. Correction Method Utilizing Plural Land Marks>

Next, a correction method in a case where plural land marks are observed will be described. In the above methods utilizing one land mark, the above difference is reduced only around the land mark of interest, however, differences may increase around other land marks. Accordingly, shift detection is performed for all the land marks included in the visual field of camera (plural land marks) and utilized by averaging.

Figure 3:
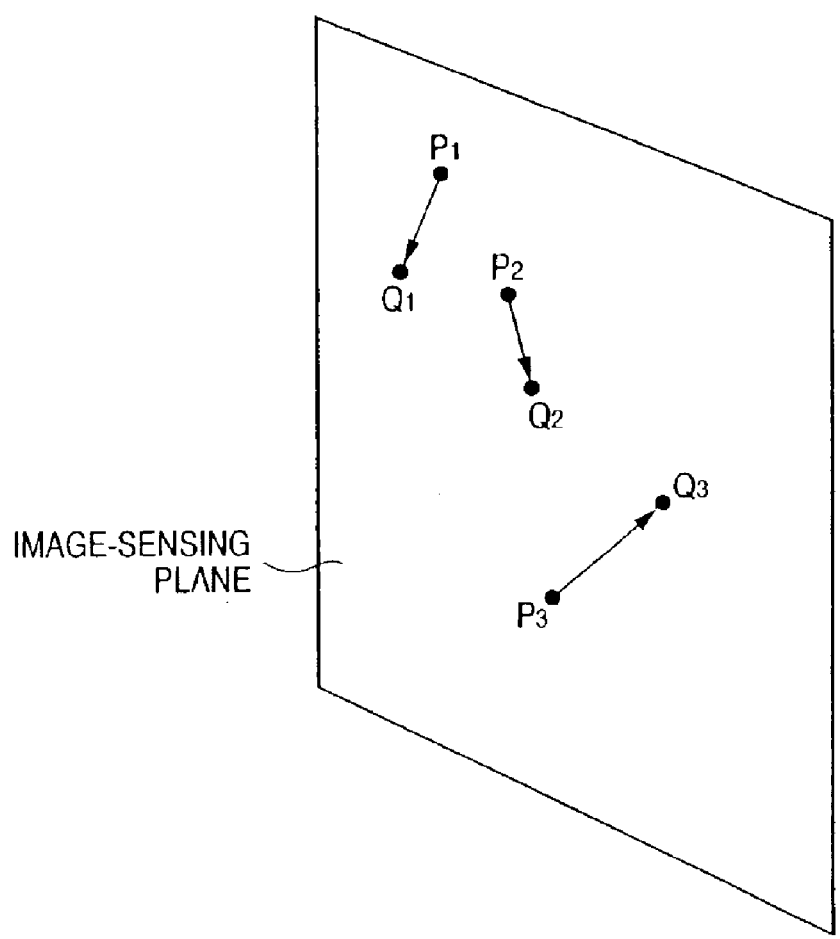
FIG. 3 is a schematic diagram for explanation of correction method utilizing plural land marks.

FIG. 3 is a schematic diagram for explanation of correction method utilizing plural land marks. Points $P_1$, $P_2$ and $P_3$ indicate respective land mark positions on the image-sensing plane predicted based on position and orientation of camera, and points $Q_1$, $Q_2$ and $Q_3$, positions on which the actual land mark positions are projected on the image-sensing plane. The rotation and/or parallel movement of camera is performed such that the points $P_1$, $P_2$ and $P_3$ correspond with the points $Q_1$, $Q_2$ and $Q_3$ by averaging. Hereinbelow, the correction will be more particularly described.

<2-1. Correction Method by Rotation of Camera Utilizing Plural Land Marks>

Figure 4:
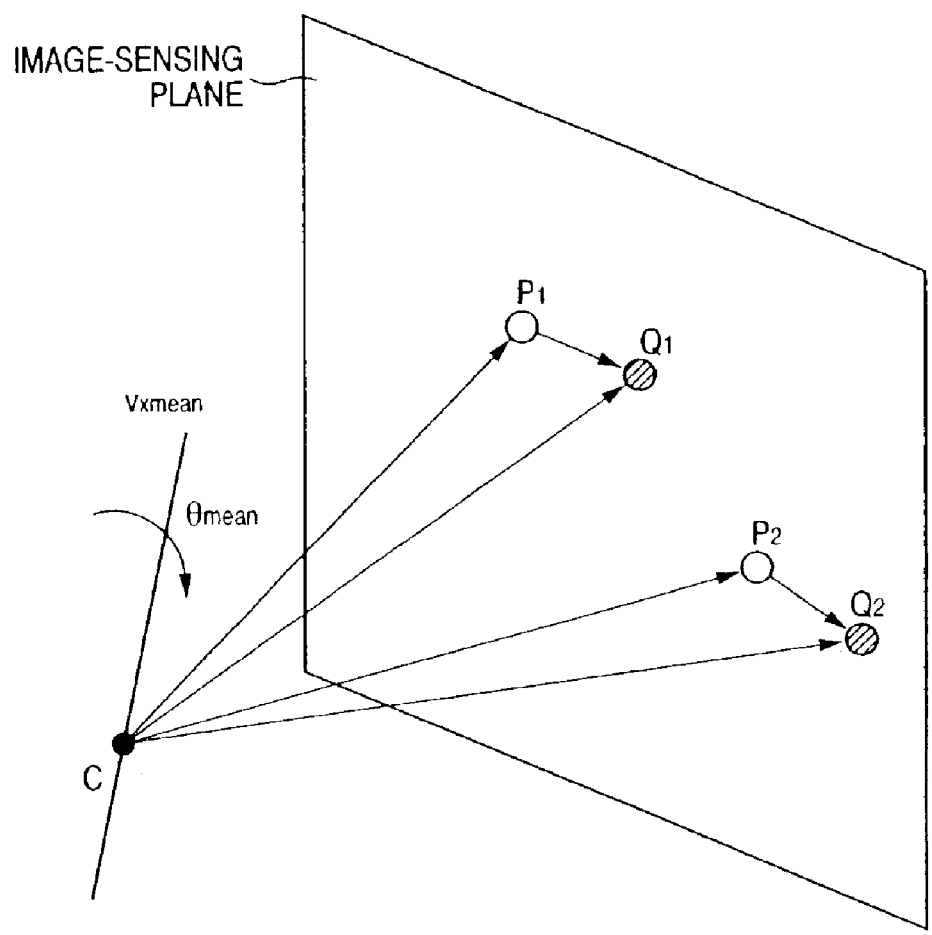
FIG. 4 is a schematic diagram for explanation of method for correcting plural landmarks by rotation of camera in pan/tilt direction.

In this method, correction is made by rotation of camera. Instead of a representative point, rotation angles of camera and directional vectors of rotation axis are obtained for the respective land marks, by the above-described correction method by rotation of camera, and the obtained values are used by averaging. FIG. 4 is a schematic diagram showing the averaging correction method by utilizing rotation of camera in a case where plural land marks are used.

Figure 12:
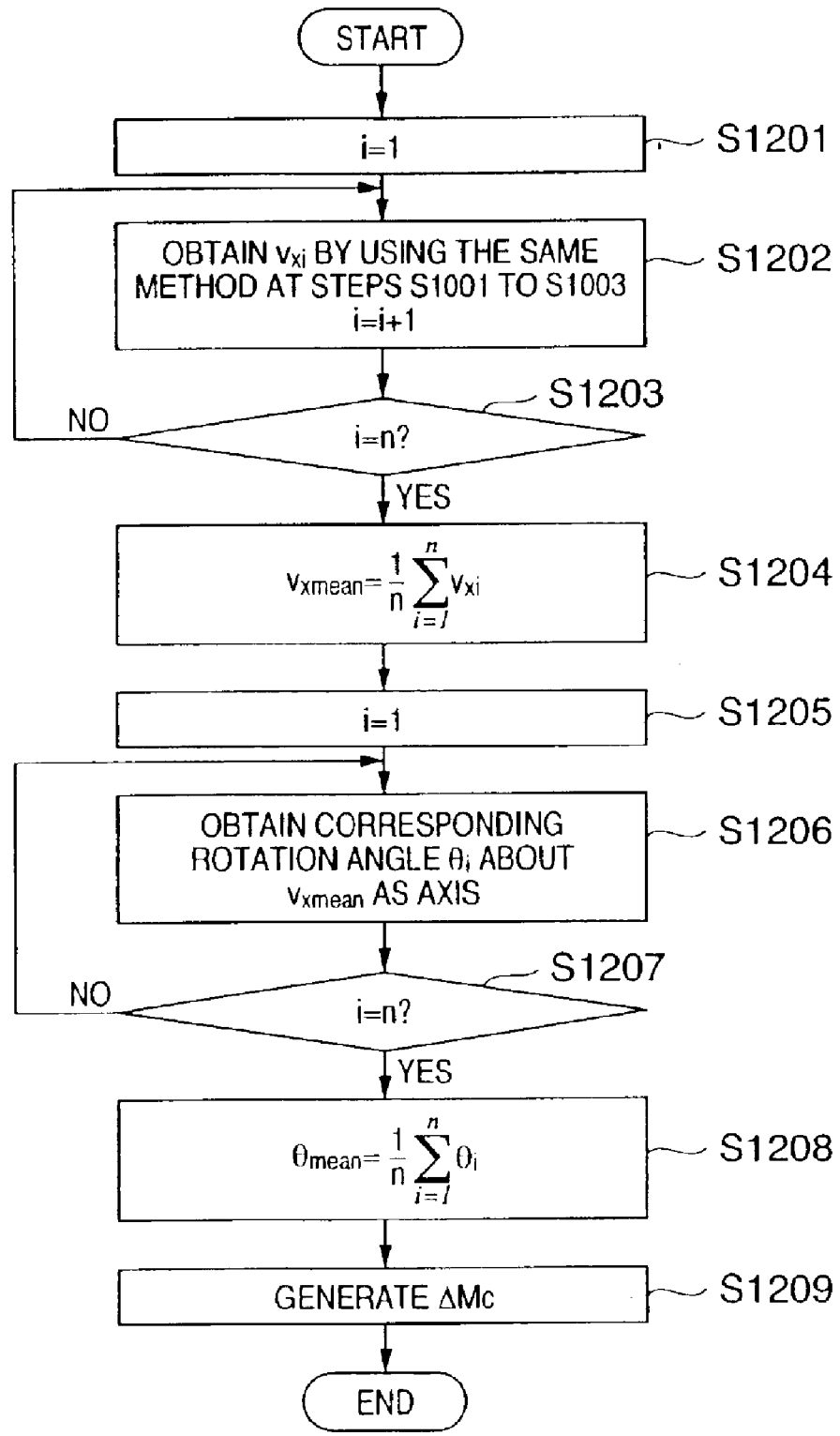
FIG. 12 is a flowchart showing correction by rotation of camera by utilizing plural land marks.

Hereinbelow, the correction method by rotation of camera in a case where plural land marks are used will be described with reference to the flowchart of FIG. 12.

A variable indicating respective land mark positions on the image-sensing plane predicted based on the position and orientation of camera is $P_i$ ($1 \leq i \leq n$), a variable indicating positions where actual land mark positions are projected on the image-sensing plane is $Q_i$ ($1 \leq i \leq n$).

First, with regard to $P_i$ and $Q_i$, a directional vector $v_{xi}$ of straight line of rotation axis is obtained by a similar method to the above-described "correction method by rotation of camera utilizing one land mark" (steps S1201 to S1203). Then, a mean value $v_{xmean}$ of all the vectors $v_{xi}$ is obtained (step S1204)

$$v_{xmean} = \frac{(v_{x1} + v_{x2} + \cdots v_{xn})}{n} \quad \text{[Expression 9]}$$

Figure 5:
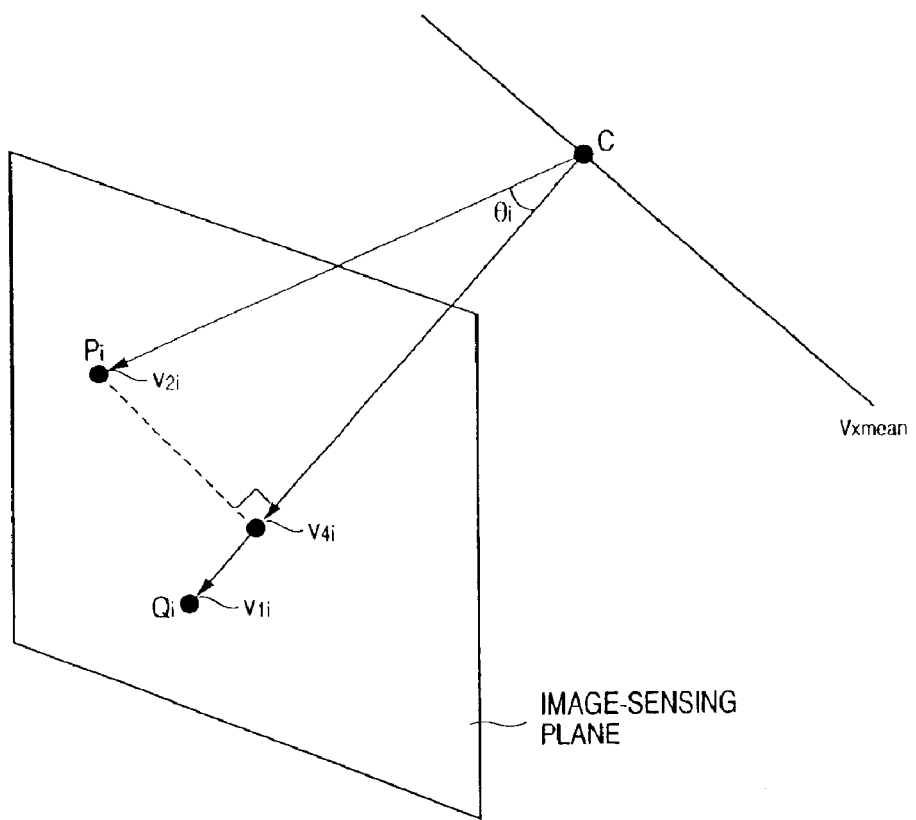
FIG. 5 is a schematic diagram for explanation of method for generating vector $V_{4i}$.

Next, a rotation angle for rotation about the rotation axis (the straight line with $v_{xmean}$ as a directional vector) is obtained (step S1206). First, a plane $S_i$ passing through a vector $v_{1i}$ from the point C to the point $Q_i$ and $v_{xmean}$ is obtained. Then, a vector $v_{4i}$, which is projected from a vector $v_{2i}$ from the point C to the point $P_i$ on the plane $S_i$, is obtained. FIG. 5 is a schematic diagram showing a method for generating the vector $V_{4i}$ calculated by the above processing. In FIG. 5, the rotation angle when the point $P_i$ corresponds with the point $Q_i$ by rotation of camera is θi. The rotation angle θi can be obtained by the following expression by using vectors $v_{2i}$ and $v_{4i}$.

$$v'_{2i} = \frac{v_{2i}}{|v_{2i}|} \quad \text{[Expression 10]}$$

$$v'_{4i} = \frac{v_{4i}}{|v_{4i}|}$$

$$\theta_i = \arccos(v'_{2i} \cdot v'_{4i})$$

Then a mean value $\theta_{mean}$ of all the rotation angles $\theta_i$ is calculated (step S1208).

$$\theta_{mean} = \frac{(\theta_1 + \theta_2 + \cdots \theta_n)}{n} \quad \text{[Expression 11]}$$

As a result, the camera is rotated by the rotation angle $\theta_{mean}$ about the rotation axis with $v_{xmean}$ as its directional vector, thereby the rotation of camera reflecting all the points $P_i$ and $Q_i$ on the image-sensing plane can be performed. As a result of the above calculation, the correction matrix $\Delta M_c$ is obtained by using $v_{xmean}$ and $\theta_{mean}$ (step S1209). Assuming that $V_{mean}=(l', m', n')$ holds, the correction matrix $\Delta M_c$ is represented by the following expression.

$$\Delta Mc = \begin{bmatrix} l'l'(1-\cos\theta_{mean})+\cos\theta_{mean} & m'l'(1-\cos\theta_{mean})+n\sin\theta_{mean} & n'l'(1-\cos\theta_{mean})+m'\sin\theta_{mean} & 0 \\ l'm'(1-\cos\theta_{mean})+n\sin\theta_{mean} & m'm'(1-\cos\theta_{mean})+\cos\theta_{mean} & n'm'(1-\cos\theta_{mean})+l'\sin\theta_{mean} & 0 \\ l'n'(1-\cos\theta_{mean})+m'\sin\theta_{mean} & m'n'(1-\cos\theta_{mean})+l'\sin\theta_{mean} & n'n'(1-\cos\theta_{mean})+\cos\theta_{mean} & 0 \\ 0 & 0 & 0 & 1 \end{bmatrix} \quad \text{[Expression 12]}$$

The position and orientation of camera (external parameter) can be corrected by multiplying the matrix indicating the position and orientation of camera by the correction matrix $\Delta M_c$. That is, the respective points $P_i$ on the image-sensing plane are displayed on the respective $Q_i$ positions, by averaging, thus the predicted positions of land marks correspond with the actual positions by averaging. By this method, the correction matrix can be generated by reflecting information on all the land marks on the image-sensing plane.

<2-2. Correction Method by Parallel Movement of Camera Utilizing Plural Land Marks>

Figure 6:
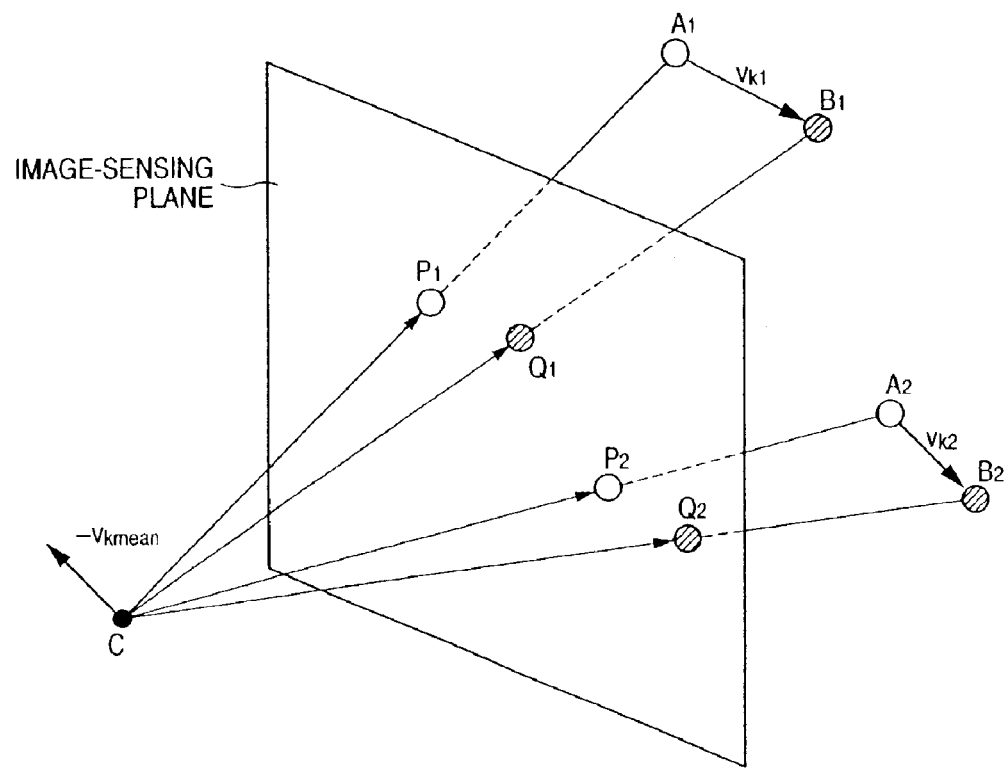
FIG. 6 is a schematic diagram for explanation of method for correcting plural land marks by parallel movement of camera.

In this method, parallel movement components of camera are obtained for the respective land marks by using the above-described correction method by parallel movement of camera and used by averaging. FIG. 6 is a schematic diagram showing a method for correcting plural land marks by parallel movement of camera.

Figure 13:
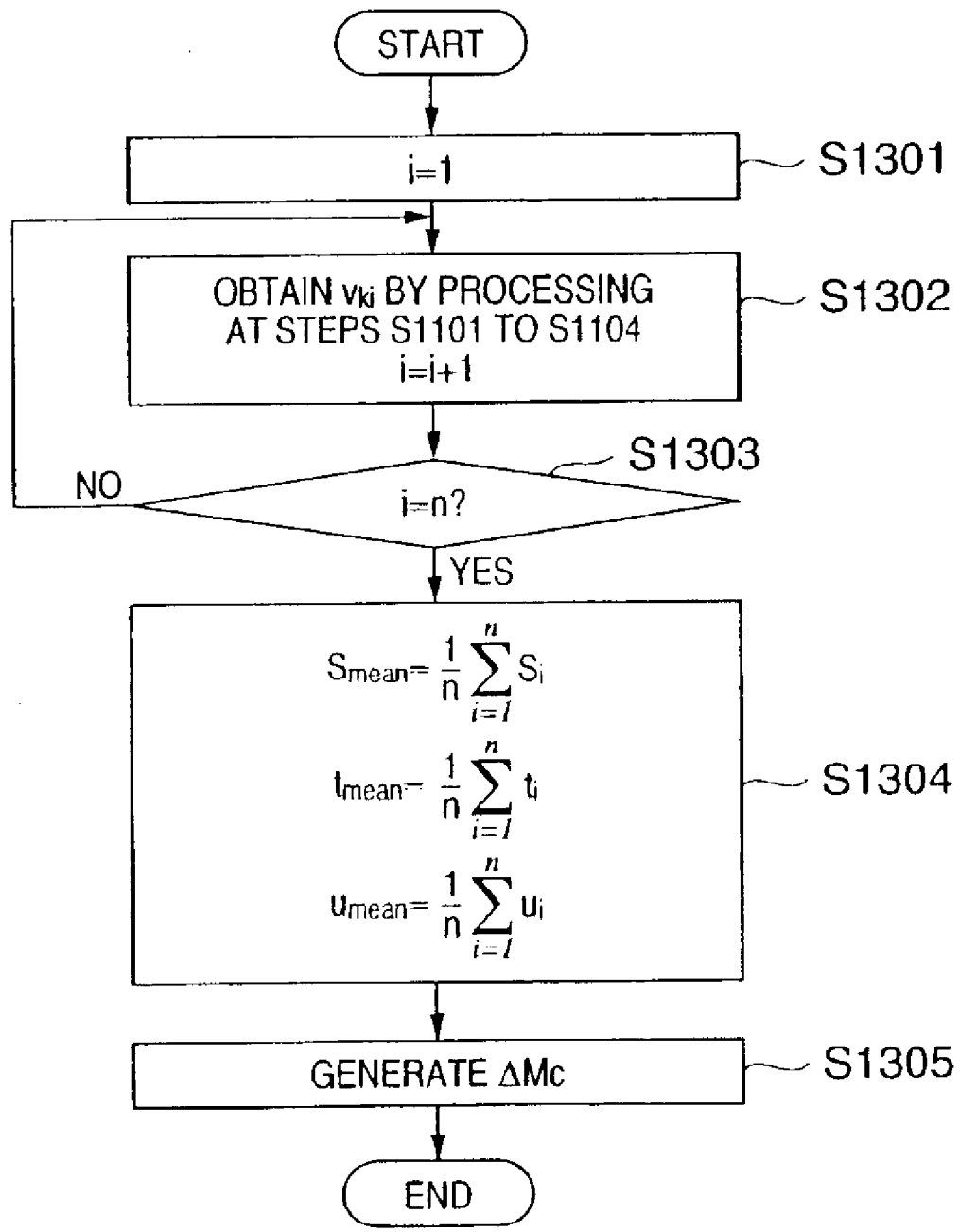
FIG. 13 is a flowchart showing correction by parallel movement of camera by utilizing plural land marks.

Hereinbelow, the processing of the correction method will be described with reference to the flowchart of FIG. 13.

A variable indicating respective land mark positions on the image-sensing plane predicted based on the position and orientation of camera is $P_i$ ($1 \leq i \leq n$), a variable indicating positions where actual land mark positions are projected on the image-sensing plane is $Q_i$ ($1 \leq i \leq n$). First, a vector $v_{ki}=(s_i, t_i, u_i)$ with respect to the points $P_i$ and $Q_i$ is obtained by using the above-described correction method by parallel movement of camera using one feature point (step S1301 to S1303). Then, mean values of the respective points $P_i$ and $Q_i$ are obtained (step S1304).

$$\frac{s_{mean}(s_1 + s_2 + \cdots + s_n)}{n} \quad \text{[Expression 13]}$$

$$\frac{t_{mean}(t_1 + t_2 + \cdots + t_n)}{n}$$

$$\frac{u_{mean}(u_1 + u_2 + \cdots + u_n)}{n}$$

Then, the correction matrix is obtained by using a mean vector $V_{kmean}=(s_{mean}, t_{mean}, u_{mean})$ as follows (step S1305).

$$\Delta M_c = \begin{bmatrix} 1 & 0 & 0 & -s_{mean} \\ 0 & 1 & 0 & -t_{mean} \\ 0 & 0 & 1 & -u_{mean} \\ 0 & 0 & 0 & 1 \end{bmatrix} \quad \text{[Expression 14]}$$

<3. Correction Method by Rotation about Axis Parallel to Visual Axis>

In the above-described 4 correction methods, as it is understood from the directions of correction as shown in FIGS. 4 and 6, the difference in rotational angle about the visual axis cannot be corrected even using correction values obtained by rotation and parallel movement. Accordingly, in the present embodiment, a correction matrix $\Delta M'_c$ is obtained by multiplying the correction matrix $\Delta M_c$ obtained by the above methods by a rotation correction matrix $\Delta M_{rc}$ for the visual axis, and the position and orientation matrix of camera is multiplied by the matrix $\Delta M'_c$, thereby the position and orientation of camera can be corrected. Note that in this method, it is necessary to use 2 or more land marks on the image-sensing plane.

Figure 7:
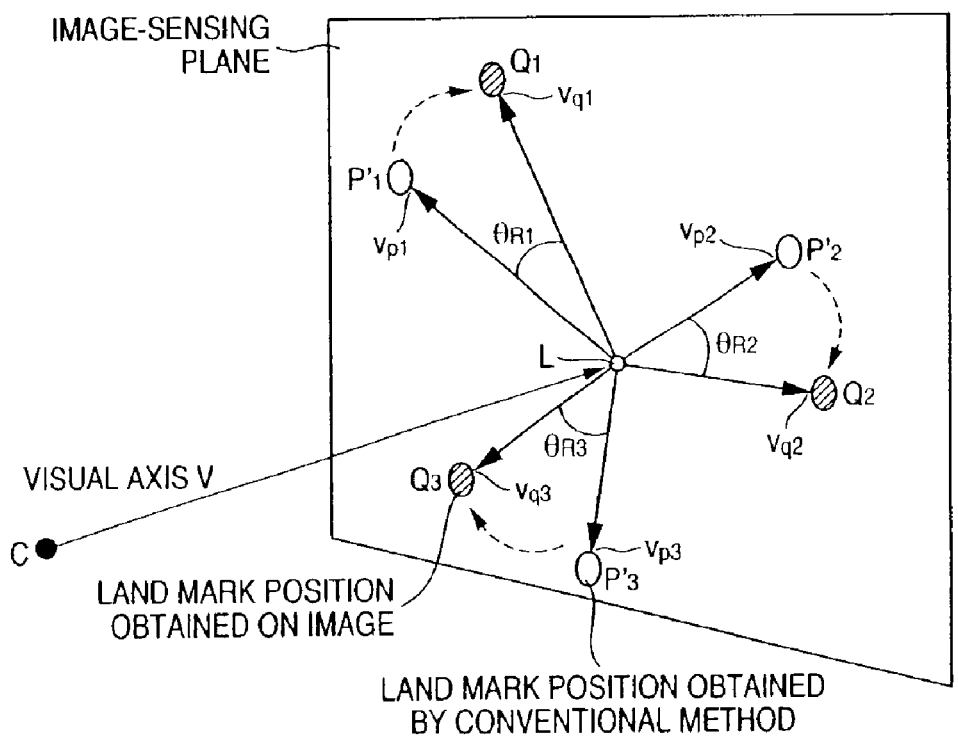
FIG. 7 is a schematic diagram for explanation of correction method by rotation about the visual axis according to an embodiment of the present invention.

FIG. 7 is a schematic diagram for explanation of correction method by rotation about the visual axis according to the present embodiment. Points $P'_1$, $P'_2$ and $P'_3$ are values corrected by any of the above-described 4 methods. The visual axis V is a vector from the view point position (center of camera) C to the principal point L. In the present embodiment, the rotation of camera is performed about the visual axis V such that the points $P'_1$, $P'_2$ and $P'_3$ correspond with the points $Q_1$, $Q_2$ and $Q_3$ by averaging. Note that $\theta_{R1}$, $\theta_{R2}$ and $\theta_{R3}$ are angles formed with the points $P'_1$ and $Q_1$, $P'_2$ and $Q_2$, and $P'_3$ and $Q_3$ (with the principal point L as the center). Further, vectors from the principal point L to the points $P'_1$, $P'_2$ and $P'_3$ are $v_{p1}$, $v_{p2}$ and $v_{p3}$, and vectors from the principal point L to the points $Q_1$, $Q_2$ and $Q_3$ are $v_{q1}$, $v_{q2}$ and $v_{q3}$.

The correction processing of the present embodiment is performed on the assumption that 2 or more land marks exist on the image-sensing plane. In a case where there is only one land mark, the matrix $\Delta M_c$ is regarded as the matrix $\Delta M'_c$. Further, if there is no land mark, the position and orientation of camera obtained by another position and orientation sensor can be utilized.

<3-1. Method 1>

Figure 14:
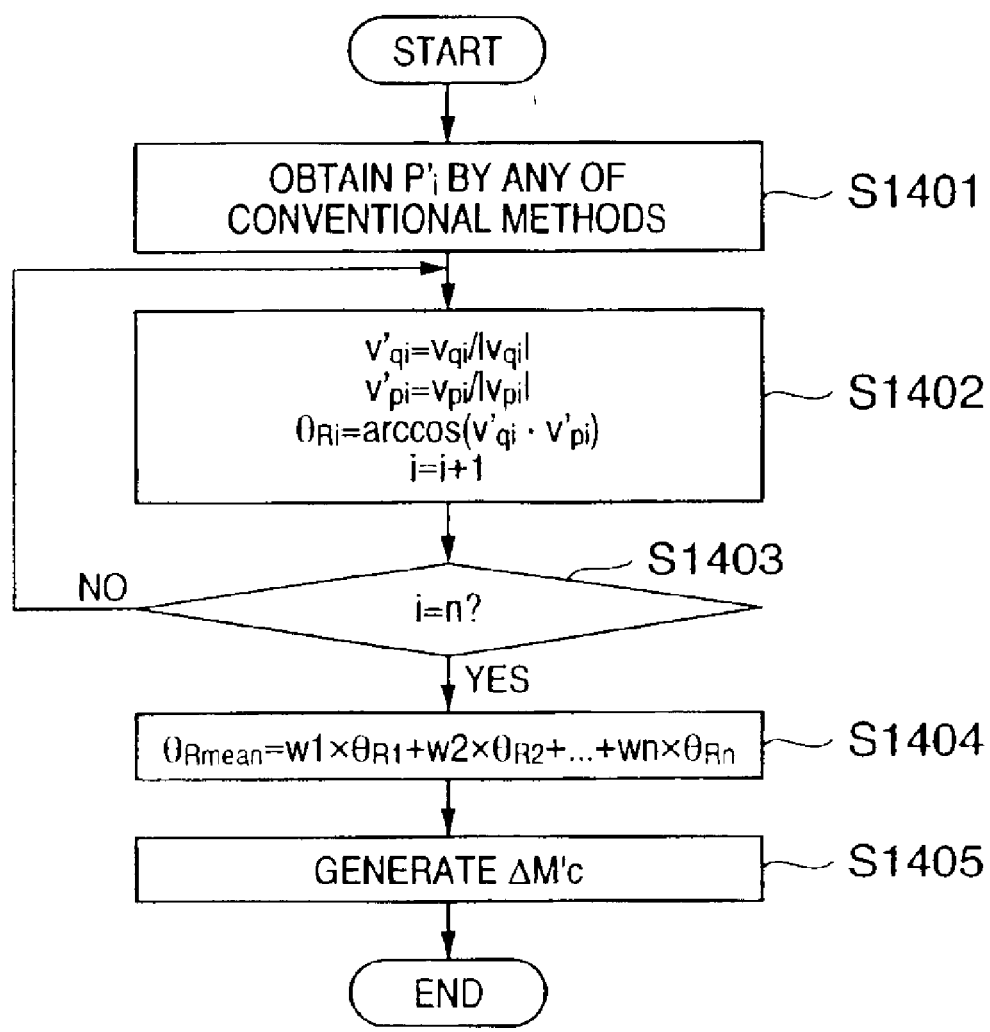
FIG. 14 is a flowchart showing a correction method including additional correction processing according to the present embodiment.

Hereinbelow, the processing of the correction method according to the present embodiment will be described with reference to the flowchart of FIG. 14.

First, a predicted position $P'_i$ of the position and orientation of camera is obtained by any of the 4 correction methods described in 1-1, 1-2, 2-1 and 2-2 (step S1401).

Next, an angle $\theta_{Ri}$ formed with vectors $v_{qi}$ and $v_{pi}$ is obtained. In FIG. 7, the rotation angle for correspondence between the point $P'_i$ with the point $Q_i$ is $\theta_{Ri}$, which is obtained by using the vectors $v_{qi}$ and $v_{pi}$ by the following expression (step S1402).

$$v'_{qi} = \frac{v_{qi}}{|v_{qi}|}$$ [Expression 15]

$$v'_{pi} = \frac{v_{pi}}{|v_{pi}|}$$

$$\theta_{Ri} = \arccos(v'_{qi} \cdot v'_{pi})$$

Then, a mean value $\theta_{Rmean}$ of all the rotation angles $\theta_{Ri}$ is calculated.

$$\theta_{Rmean} = \frac{(\theta_{R1} + \theta_{R2} + \theta_{R3} + \cdots + \theta_{Rn})}{n}$$ [Expression 16]

As a result, the camera is rotated about the rotation axis with the visual axis as a directional vector by the rotation angle $\theta_{Rmean}$, thereby the point $P'_i$ on the image-sensing plane corresponds with the point $Q_i$.

However, as it is understood from the above expression to obtain the vectors $v'_{qi}$ and $v'_{pi}$, if $|v_{qi}|$ or $|v_{pi}|$ is 0, i.e., if the position of $Q_i$ is on the principal point L as the center of rotation on the image-sensing plane, the angle $\theta_{Ri}$ is not fixed and the correction rotation angle cannot be calculated. One method for calculation of the correction rotation angle in this state is weighting the rotation angle $\theta_{Ri}$, and reducing the weight of the rotation angle $\theta_{Ri}$ as the point $Q_i$ is closer to the principal point L, and the weight is 0 on the principal point L. By this method, the rotation correction angle can be obtained from other rotation angle than the unfixed rotation angle without influence by the unfixed rotation angle. The correction rotation angle using weighting is obtained by the following expression (step S1404).

$$\theta_{Rmean} = w_1 \cdot \theta_{R1} + w_2 \cdot \theta_{R2} + w_3 \cdot \theta_{R3} + \ldots + w_n \cdot \theta_{Rn}$$ [Expression 17]

Note that the method for eliminating the influence of the unfixed rotation angle is not limited to the method by weighting, but any other method is applicable to the present embodiment as long as it can obtain an appropriate correction rotation angle.

A function to determine a weighted coefficient $w_i$ is set such that the weight is reduced as the position is closer to the principal point L and becomes 0 on the principal point L. Assuming that the function is f and $|v_{qi}|$ is $d_{qi}$, the following expression holds.

$$w_i = f(d_{qi})$$ [Expression 18]

An example of the function f is as follows.

$$f(d_{qi}) = \begin{cases} 1 & (d_{qi} > t) \\ \frac{d_{qi}}{t} & (d_{qi} \leq t) \end{cases}$$ [Expression 19]

Note that in the present embodiment, after the correction by parallel movement or rotation utilizing marker(s), rolling correction about the visual axis is performed as secondary correction. Immediately before the secondary correction, there is not a wide difference occurs between $|v_{qi}|(=d_{qi})$ and $|v_{pi}|(=d_{pi})$. Accordingly, correction can be sufficiently made by weighting with $d_{qi}$ as an argument. Even if the point $P_i$ is on the principal point L, the unfixed $\theta_{Ri}$ is ignored. However, weighting in consideration of $d_{pi}$ can be performed. That is, the function to determine the weighted coefficient $w_i$ is not limited to the function f with $d_{qi}$ as an argument, but other function obtained by multiplying the function f by a function with $d_{pi}$ as a coefficient, as follows, may be employed.

$$w_i = f(d_{qi}) \cdot f(d_{pi})$$

The correction matrix $\Delta M'_c$ is obtained from the result of the above calculation (step S1405). As the visual axis vector V is a straight line vertical to the image-sensing plane, the expression to obtain the rotation correction matrix $\Delta M_{rc}$ to the visual axis is as follows.

$$\Delta M_{rc} = \begin{bmatrix} \cos\theta_{Rmean} & -\sin\theta_{Rmean} & 0 & 0 \\ \sin\theta_{Rmean} & \cos\theta_{Rmean} & 0 & 0 \\ 0 & 0 & 1 & 0 \\ 0 & 0 & 0 & 1 \end{bmatrix}$$ [Expression 20]

The correction matrix $\Delta M_c$ obtained by any of the above-described 4 correction methods is multiplied by the rotation correction matrix $\Delta M_{rc}$ to the visual axis, thereby the final correction matrix $\Delta M'_c$ is obtained.

$$\Delta M'_c = \Delta M_{rc} \cdot \Delta M_c$$ [Expression 21]

The matrix indicating the position and orientation of camera is multiplied by the final correction matrix $\Delta M'_c$, thereby the position and orientation of camera (external parameter) can be corrected.

The difference of position and orientation of camera to rotation in the visual axis direction can be corrected by application of this method, and the difference between the predicted land mark position and the actual position can be further reduced.

<3-2. Method 2>

In the above <Method 1>, when the mean value of rotation angles is obtained at step S1404, the weight around the principal point L is reduced. However, in a case where a virtual object is overlaid, a user often pays attention to a position around the virtual object of interest. Accordingly, the position and orientation of camera can be determined by utilizing this phenomenon. That is, in a case where plural land marks obtained by image sensing are used by averaging, the influence of land mark near a position of interest is increased in comparison with other land marks, and emphasis is placed on the position of interest. By this processing, the influence of noise in positions other than the position of interest can be reduced, and the parameter of position and orientation of camera with higher reliability can be identified.

In the <Method 2>, as an example of increasing the influence of land mark around the point of interest, a method for increasing the influence of land mark around an object of interest by utilizing a mean weight value upon averaging calculation of rotation angle will be described.

Note that the object of interest is a virtual object. In a case where plural virtual objects exist in a scene, since there is a high possibility that a virtual object closest to the center of image (not the principal point L) attracts attention, a virtual object drawn in a position closest to the center of image is selected as an object of interest. Further, it may be arranged such that not only the closest virtual object but also all the virtual objects are weighted. As a method for weighting, a method allowing a user to select a weight or a method of increasing the weight of virtual object at the center of image while reducing the weight as the object is away from the center, and the like, are applicable.

The expression of weighted averaging is as follows.

$$\theta_{mean}=w_{e1}\cdot\theta_{R1}+w_{e2}\cdot\theta_{R2}+w_{e3}\cdot\theta_{R3}+\ldots+w_{en}\theta_{Rn} \quad \text{[Expression 22]}$$

$$w_{e1}+w_{e2}+w_{e3}+\ldots+w_{en}=1 \quad \text{[Expression 22]}$$

Note that the method for increasing the influence of land mark around the point of interest is not limited to the method utilizing weighted averaging, but any other method is applicable to the present embodiment as long as it improves position accuracy around the object of interest.

A function to determine $w_{ei}$ is set such that the weight is the minimum around the principal point L and is the maximum on the point of interest. As an example of the function, the following expression can be given. Assuming that the distance between a point of interest S and a point Q is $d_{si}$, the function to determine $w_{ei}$ is expressed as follows.

$$w_{ei}=f(d_{qi})\cdot g(d_{si}) \quad \text{[Expression 23]}$$

The function f is the function as described in the above <Method 1>. As an example of the function g, the following expression is given.

$$g(d_{si})=u-d_{si} \quad \text{[Expression 24]}$$

Note that u is a constant such that the sum of $w_{ei}$ is 1.

<3-3. Method 3>

In the <Method 1> and <Method 2>, the final correction matrix $\Delta M'_c$ is obtained by utilizing the correction matrix $\Delta M_c$ obtained by selecting one of the general 4 types of correction methods.

In the <Method 3>, the correction matrix $\Delta M_c$ is obtained by combination of the above 4 methods, and the final correction matrix $\Delta M'_c$ is obtained by multiplying the matrix $\Delta M_c$ by the rotation correction matrix $\Delta M_{rc}$ to the visual axis. By performing the correction by parallel movement conversion and rotation transformation, thereby the difference in the predicted land mark position can be reduced.

Note that the order of execution of correction by rotation and correction by parallel movement and the order of execution of correction using one land mark and correction using plural land marks is not fixed, but any one of the correction processings may be performed first. However, the type of correction processing performed next must be different. For example, after the correction by parallel movement of camera, the correction by rotation of camera is performed. If the same type of correction processings are continuously performed, such as continuous execution of correction by parallel movement utilizing plural land marks by averaging and correction by parallel movement utilizing one land mark, the subsequent correction cancels the result of correction by the immediately prior correction, and the result is the same as that of the latter correction.

Further, the above-described 4 correction processings (1-1, 1-2, 2-1 and 2-2) may be sequentially repeated several times. Note that as described above, at this time, the same type of correction processings are not continuously performed (1-1 and 2-1 processings must not be continuously performed, and 1-2 and 2-2 processings must not be continuously performed). Further, at this time, in addition to the repetition of the processings predetermined number of times, the repetition may be determined based on the difference between a predicted land mark position on the image-sensing plane predicted from the position and orientation of camera and the position obtained by actual image sensing. For example, the processings may be repeated until the difference becomes equal to or less than a predetermined threshold value, or may be repeated until the change amount of difference becomes a predetermined value. Otherwise, the combination thereof (e.g. the processings are repeated until the difference becomes equal to or less than the threshold value or the change amount of difference becomes equal to or less than the threshold value) may be employed.

In this manner, the final correction matrix $\Delta M'_c$ is obtained by multiplying the $\Delta M_c$ obtained by any of the above methods by the rotation correction matrix $\Delta M_{rc}$ with the straight line parallel to the visual axis as its axis.

<4. Example of Application of Correction to Combined Reality Producing Apparatus>

Figure 8:
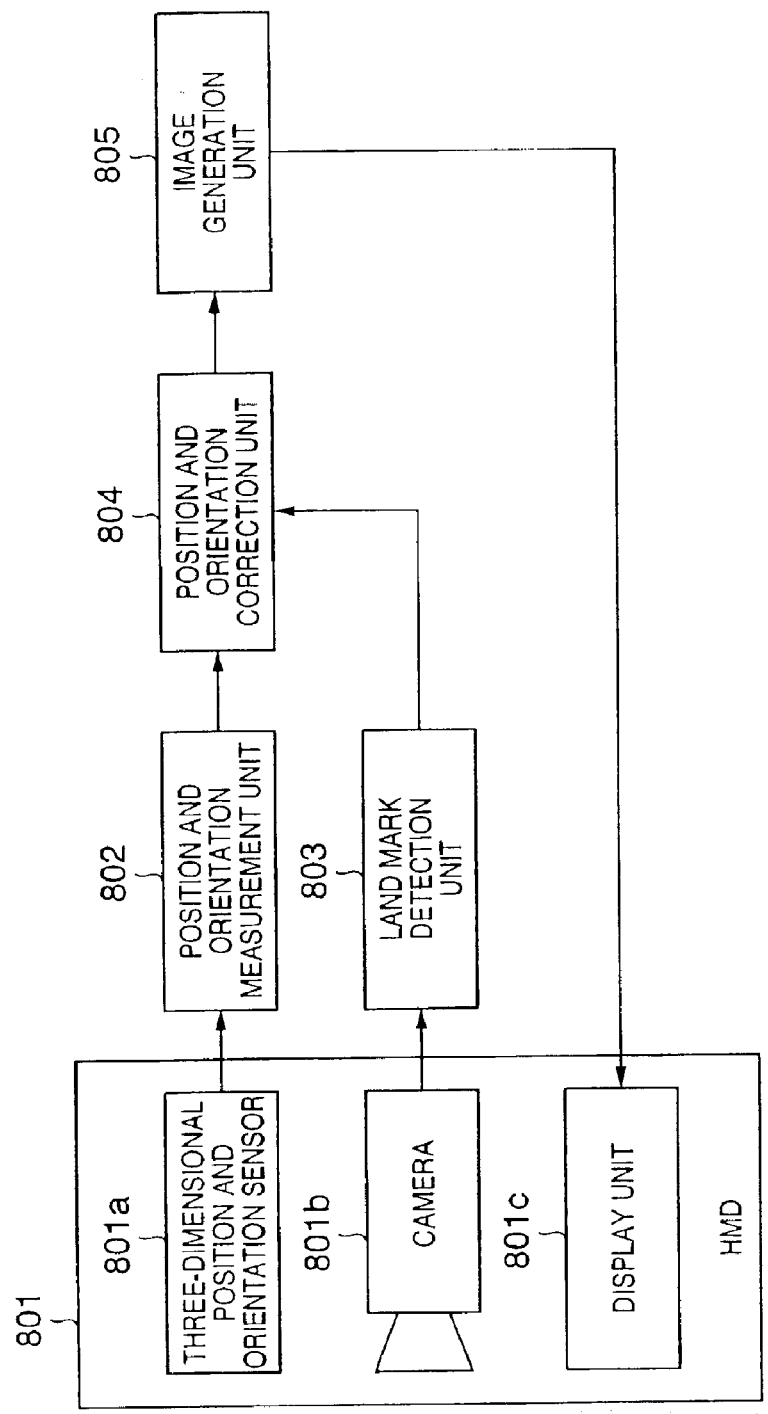
FIG. 8 is a block diagram showing the schematic construction of combined reality producing apparatus according to the present embodiment.

FIG. 8 is a block diagram showing the schematic construction of combined reality producing apparatus for combining an image of actual space with an image of nonrealistic space such as computer graphics, to which the above correction processing of the present embodiment is applied. Numeral 801 denotes a head mount display (HMD) having a three-dimensional position and orientation sensor 801a which outputs a signal based on the position and orientation of the HMD 801 in three-dimensional space to a position and orientation measurement unit 802 to be described later, a camera 801b which performs image sensing on actual space, and a display unit 801c which provides a video image to a user who wears the HMD 801 on the head. Note that the HMD 801 of the present embodiment is a video see-through type display and the position and orientation of the HMD 801 means the position and orientation of the camera 801b.

The position and orientation measurement unit 802 generates a matrix indicating the position and orientation of the HMD 801 (viewing transformation matrix) based on the signal outputted from the three-dimensional position and orientation sensor 801a. Numeral 803 denotes a land mark detection unit which detects a land mark from the video image obtained by image sensing by the camera 801b and detects the position of land mark. The method for detection is not particularly limited, but detection of land mark and its position can be made by using a marker having a particular color and detecting the particular color in the video image obtained by the camera 801b.

Numeral 804 denotes a position and orientation correction unit which calculates the correction matrix $\Delta M'_c$ by using the correction processing (<Method 1>, <Method 2>, <Method 3>) including the above-described correction by rotation about the visual axis, based on position information of respective land marks outputted from the land mark detection unit 803, multiplies the matrix indicating the position and orientation of the HMD 801 outputted from the position and orientation measurement unit 802 by the correction matrix $\Delta M'_c$, thus corrects the position and orientation (external parameter) of the HMD 801. Numeral 805 denotes an image generation unit which generates a video image of virtual object based on the matrix corrected by the position and orientation correction unit 804, combines the video image of virtual object with the video image of actual space inputted from the camera 801b, and generates a combined reality video image (image). Note that data on the virtual object is stored in an external memory. The generated image is outputted to the display unit 801c.

The position and orientation measurement unit 802, the land mark detection unit 803, the position and orientation correction unit 804 and the image generation unit 805 constructs a controller of the HMD 801. The controller may be installed in the HMD 801 or provided as another device connected to the HMD 801 by cable or wireless communication.

Figure 9:
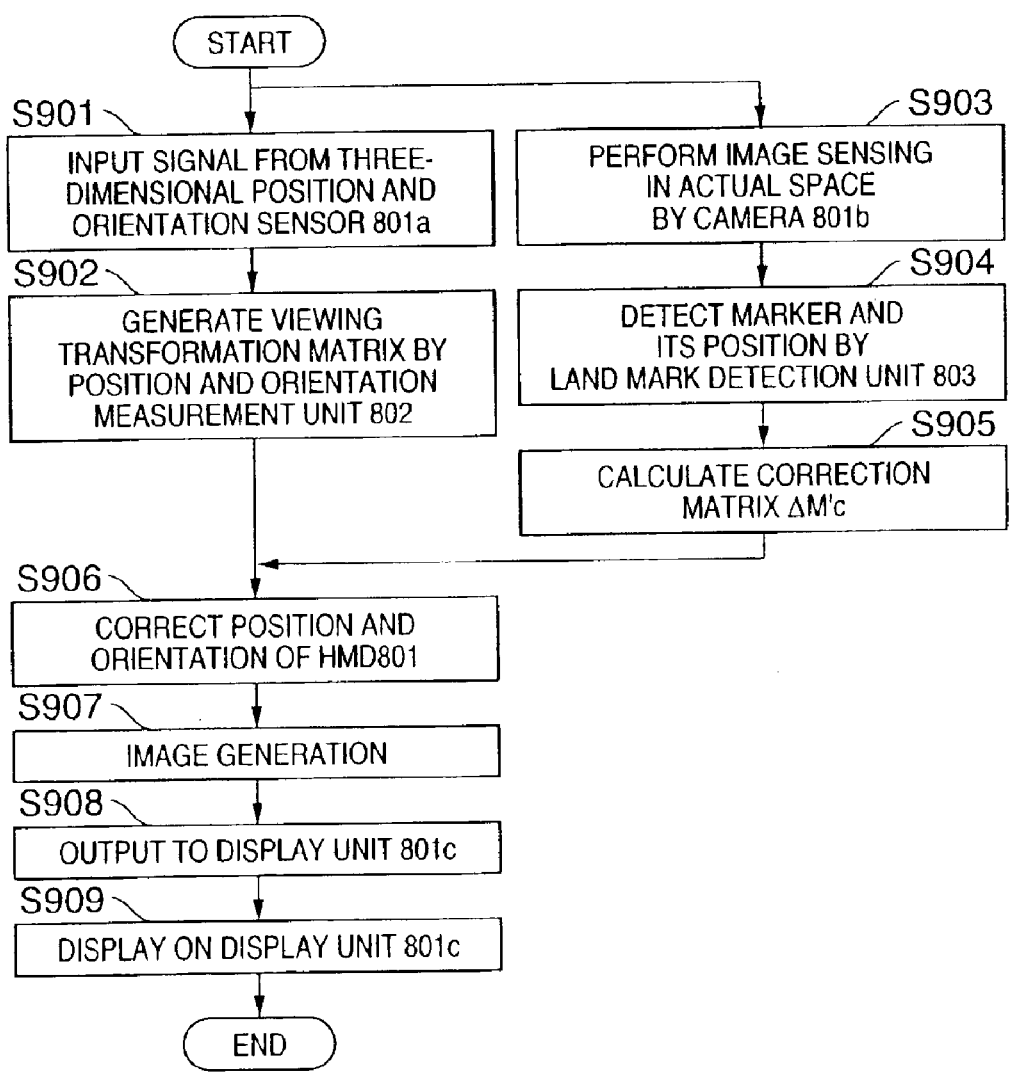
FIG. 9 is a flowchart showing processing by the combined reality producing apparatus according to the embodiment.

The processing by the controller having the above construction will be described with reference to the flowchart of FIG. 9. Further, program code according to the flowchart of FIG. 9 is stored in a memory (not shown) such as a RAM or ROM in the controller according to the present embodiment, and read and executed by a CPU (not shown).

First, the signal indicating the position and orientation of the HMD 801 from the three-dimension position and orientation sensor 801a is inputted into the position and orientation measurement unit 802 (step S901), and the position and orientation measurement unit 802 generates the viewing transformation matrix indicating the position and orientation of the HMD 801 based on the input signal (step S902). On the other hand, a video image of actual space is obtained by image sensing by the camera 801b (step S903), and the obtained video image is inputted into the land mark detection unit 803, and a land mark and its position are detected (step S904). The position and orientation correction unit 804 generates the correction matrix $\Delta M'_c$ by the above-described method (<Method 1>, <Method 2>, <Method 3>) by using the detected land mark position (step S905).

The position and orientation correction unit 804 corrects the position and orientation of the HMD 801 by using the viewing transformation matrix indicating the position and orientation of the HMD 801 and the correction matrix $\Delta M'_c$, generated by the above respective processings (step S906). The image generation unit 805 generates a video image of virtual object based on the external parameter indicating the corrected position and orientation of the HMD 801, and generates a combined reality video image (step S907). Then, the generated combined reality video image is outputted to the display unit 801c (step S908), and displayed by the display unit 801c (step S909).

As described above, according to the present embodiment, the parameter indicating the position and orientation of camera, measured by the method other than utilization of video image obtained by image sensing of actual space by an image sensing apparatus (e.g., by using a three-dimensional position and orientation sensor), is corrected by utilizing correction method by rotation of camera in pan and/or tilt direction and/or parallel movement of camera, using land mark(s) obtained by image sensing, then, correction to eliminate the difference regarding the visual axis is performed. Accordingly, correction with higher reliability can be performed on the parameter indicating the position and orientation of camera. Further, any form of correction can be utilized as long as it is used for the purpose of determination of position and orientation of image sensing apparatus.

Accordingly, according to the correction processing apparatus and method of the present embodiment, even if the accuracy of measurement of the position and orientation of the HMD 801 by the three-dimensional position and orientation sensor 801a is not sufficient, the position and orientation of the HMD 801 can be corrected with high accuracy.

Further, even though the video image of actual space obtained by image sensing by the camera 802b in the HMD 801, and the video image of virtual object generated based on the position and orientation of the HMD 801 are combined, a positional shift therebetween can be prevented.

Further, as the correction of the position and orientation of the HMD 801 is performed by using all the land marks on the image-sensing plane, the correction values can be prevented from greatly varying due to change of visual field of the camera.

The object of the present invention can be also achieved by providing a storage medium (or recording medium) holding software program code for performing the aforesaid functions according to the embodiment to a system or an apparatus, reading the program code with a computer (e.g., CPU, MPU) of the system or apparatus from the storage medium, then executing the program. In this case, the program code read from the storage medium realizes the functions according to the embodiment, and the storage medium holding the program code constitutes the invention. Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiment.

As described above, according to the present invention, the position and orientation of image sensing means can be detected with high accuracy.

As many apparently widely different embodiments of the present invention can be made without departing from the spirit and scope thereof, it is to be understood that the invention is not limited to the specific embodiments thereof except as defined in the appended claims.

What is claimed is:

1. A position and orientation determination method for identifying a parameter indicating position and orientation of image sensing means for performing image sensing on actual space, in which plural feature points exist in already-known three-dimensional positions, comprising:

a measurement step of measuring the position and orientation of said image sensing means by a method other than utilization of video image obtained by image sensing by said image sensing means, and obtaining a first parameter indicating the position and orientation of said image sensing means; and a correction step of correcting said first parameter obtained at said measurement step based on said plural feature points in the video image of said actual space obtained by said measurement unit, and identifying a second parameter indicating the position and orientation of said image sensing means, wherein at said correction step, said first parameter is corrected by rotation of said image sensing means about a visual axis, based on said plural feature points in said video image.

2. The position and orientation determination method according to claim 1, wherein said correction step includes:

a first correction step of correcting said first parameter by rotation of said image sensing means in pan and/or tilt direction, based on one or plural feature points in said video image; and a second correction step of obtaining said second parameter by correcting said first parameter, corrected at said first correction step, by rotation of said image sensing means about the visual axis.

3. The position and orientation determination method according to claim 1, wherein said correction step includes:

a first correction step of correcting said first parameter by movement of said image sensing means in parallel to an image-sensing plane, based on one or plural feature points in said video image; and a second correction step of obtaining said second parameter by correcting said first parameter, corrected at said first correction step, by rotation of said image sensing means about the visual axis.

4. The position and orientation determination method according to claim 1, wherein said correction step includes:

a first correction step of correcting said first parameter by rotation of said image sensing means in pan and/or tilt direction and movement of said image sensing means in parallel to an image-sensing plane, based on one or plural feature points in said video image; and a second correction step of obtaining said second parameter by correcting said first parameter, corrected at said first correction step, by rotation of said image sensing means about the visual axis.

5. The position and orientation determination method according to claim 4, wherein at said first correction step, said first parameter is corrected by alternately repeating correction by rotation and correction by movement plural times.

6. The position and orientation determination method according to claim 2, wherein said first correction step includes:

a detection step of detecting two-dimensional positions on said image-sensing plane of said one or plural feature points in said video image of actual space obtained by image sensing by said image sensing means; and a prediction step of predicting the two-dimensional positions on said image-sensing plane of said feature points, based on the position and orientation of said image sensing means measured at said measurement step, and wherein at said first correction step, said first parameter is corrected based on the positions of said feature points predicted at said prediction step and the positions of said feature points detected at said detection step.

7. The position and orientation determination method according to claim 6, wherein at said first correction step, said first parameter is corrected based on a mean value of differences between the positions of said feature points predicted at said prediction step and the positions of said feature points detected at said detection step.

8. The position and orientation determination method according to claim 6, wherein at said first correction step, said first parameter is corrected by alternately repeating correction by rotation and correction by movement plural times.

9. The position and orientation determination method according to claim 8, wherein repetition of said correction by rotation and said correction by movement is performed a predetermined number of times.

10. The position and orientation determination method according to claim 8, wherein repetition of said correction by rotation and said correction by movement is performed until differences between the positions of said feature points predicted at said prediction step and the positions of said feature points detected at said detection step become less than a predetermined value.

11. The position and orientation determination method according to claim 8, wherein repetition of said correction by rotation and said correction by movement is performed until a reduction amount of differences between the positions of said feature points predicted at said prediction step and the positions of said feature points detected at said detection step becomes less than a predetermined amount.

12. The position and orientation determination method according to claim 4, wherein at said second correction step, regarding each feature point, a rotation angle about said visual axis is obtained for correspondence between the position of said feature point on said image-sensing plane predicted at said prediction step, corrected by using a correction parameter obtained said first parameter corrected at said first correction step, and the position of said feature point on said image-sensing plane detected at said detection step, and said first parameter is corrected by using a mean value of the obtained rotation angles.

13. The position and orientation determination method according to claim 12, wherein at said second correction step, upon calculation of said mean value of the rotation angles, weighting is performed in correspondence with the positions of said feature points, and said parameter is corrected by using said mean value.

14. The position and orientation determination method according to claim 13, wherein at said second correction step, a weighted coefficient in said weighting is determined based on a distance between a position and an intersection between said visual axis and said image-sensing plane.

15. The position and orientation determination method according to claim 14, wherein said weighted coefficient is reduced in a position closer to said intersection, and becomes 0 on said intersection.

16. The position and orientation determination method according to claim 13, wherein at said second correction step, said weighting is performed by using a weighted coefficient to increase influence of a position around a position of interest.

17. A position and orientation determination apparatus for identifying a parameter indicating position and orientation of image sensing means for performing image sensing on actual space, in which plural feature points exist in already-known three-dimensional positions, comprising:

a measurement unit adapted to measure the position and orientation of said image sensing means by a method other than utilization of video image obtained by image sensing by said image sensing means, and obtain a first parameter indicating the position and orientation of said image sensing means; and a correction unit adapted to correct said first parameter obtained by said measurement unit based on said plural feature points in the video image of said actual space obtained by said measurement unit, and identify a second parameter indicating the position and orientation of said image sensing means, wherein said correction unit corrects said first parameter by rotation of said image sensing means about a visual axis, based on said plural feature points in said video image.

18. A control program for performing the position and orientation determination method according to claim 1 by a computer.

19. A storage medium holding a control program for performing the position and orientation determination method according to claim 1 by a computer.

* * * * *

UNITED STATES PATENT AND TRADEMARK OFFICE
CERTIFICATE OF CORRECTION

PATENT NO. : 6,993,450 B2
APPLICATION NO. : 10/351326
DATED : January 31, 2006
INVENTOR(S) : Kazuki Takemoto et al.

It is certified that error appears in the above-identified patent and that said Letters Patent is hereby corrected as shown below:

COLUMN 4:

Line 55, "$v_x = v'_1 x\ v'_2$." should read --$v_x = v'_1 x v'_2$--.
Line 63, "$\theta = \text{arc cos}(v'_1 \cdot v'_2)$" should read --$\theta = \arccos(v'_1 \cdot v'_2)$--.

COLUMN 6:

Line 41, "(step S1204)" should read --(step S1204).--.

Signed and Sealed this

Tenth Day of October, 2006

JON W. DUDAS
*Director of the United States Patent and Trademark Office*